United States Patent
Kim et al.

(10) Patent No.: US 11,729,497 B2
(45) Date of Patent: Aug. 15, 2023

(54) PROCESSING CIRCUITRY FOR OBJECT DETECTION IN STANDBY MODE, ELECTRONIC DEVICE, AND OPERATING METHOD THEREOF

(71) Applicant: Samsung Electronics Co., Ltd., Suwon-si (KR)

(72) Inventors: Seunghun Kim, Hwaseong-si (KR); Kyungah Jeong, Seoul (KR); Hyeong-Seok Kim, Seoul (KR)

(73) Assignee: Samsung Electronics Co., Ltd., Gyconggi-do (KR)

( * ) Notice: Subject to any disclaimer, the term of this patent is extended or adjusted under 35 U.S.C. 154(b) by 196 days.

(21) Appl. No.: 17/213,683

(22) Filed: Mar. 26, 2021

(65) Prior Publication Data

US 2022/0046181 A1    Feb. 10, 2022

(30) Foreign Application Priority Data

Aug. 7, 2020 (KR) ..................... 10-2020-0099090

(51) Int. Cl.
*H04N 23/65* (2023.01)
*G06F 1/3231* (2019.01)
(Continued)

(52) U.S. Cl.
CPC ......... *H04N 23/651* (2023.01); *G06F 1/3231* (2013.01); *G06K 7/1417* (2013.01);
(Continued)

(58) Field of Classification Search
CPC ......... H04N 5/232411; H04N 5/23219; H04N 23/651; H04N 23/611; G06F 1/3231;
(Continued)

(56) References Cited

U.S. PATENT DOCUMENTS 8,261,090 B1   9/2012  Matsuoka
8,363,893 B2   1/2013  Leung et al.
(Continued)

FOREIGN PATENT DOCUMENTS

JP    2013-062777 A    4/2013
JP    6062175 B2       1/2017

*Primary Examiner* — Timothy J Henn
(74) *Attorney, Agent, or Firm* — Harness, Dickey & Pierce, P.L.C.

(57) ABSTRACT

Disclosed is an electronic device, which includes a power supply, a first sensor acquiring first data including information about an external object, a second sensor acquiring second data including image information about the external object, and processing circuitry. The processing circuitry includes always-on domain processing circuitry configured to determine whether to need to perform face detection or QR code detection based on the first data and outputting a first control request signal of requesting a power supply to the second sensor based on a result of the determination, and not-always-on domain processing circuitry configured to control the power supply in response to the first control request signal such that a power is supplied to the second sensor, wherein the always-on domain processing circuitry is configured to perform the face detection or the QR code detection based on the second data.

19 Claims, 12 Drawing Sheets

(51) Int. Cl.
  *G06N 3/08* (2023.01)
  *G06K 7/14* (2006.01)
  *G06V 40/16* (2022.01)
  *H04N 23/611* (2023.01)

(52) U.S. Cl.
  CPC ............ *G06N 3/08* (2013.01); *G06V 40/161* (2022.01); *G06V 40/172* (2022.01); *H04N 23/611* (2023.01)

(58) Field of Classification Search
  CPC ..... G06F 1/324; G06F 1/3296; G06K 7/1417; G06K 7/1408; G06K 7/0008; G06K 7/10207; G06K 7/1404; G06N 3/08; G06N 3/063; G06N 3/04; G06V 40/161; G06V 40/172; G06V 40/16; Y02D 10/00; H04W 52/028; H02J 9/005
  See application file for complete search history.

(56) References Cited

U.S. PATENT DOCUMENTS

| | | |
|---|---|---|
| 8,817,174 B2 | 8/2014 | Shimoda |
| 9,459,889 B2 | 10/2016 | Huang et al. |
| 9,710,046 B2 | 7/2017 | Woo et al. |
| 9,870,506 B2 | 1/2018 | Gousev et al. |
| 9,875,390 B2 | 1/2018 | Lee et al. |
| 10,028,227 B2 | 7/2018 | Kim et al. |
| 2017/0346978 A1 | 11/2017 | Bando et al. |
| 2019/0073521 A1* | 3/2019 | Hsu ................. G06V 10/17 |
| 2019/0087690 A1 | 3/2019 | Srivastava |

\* cited by examiner

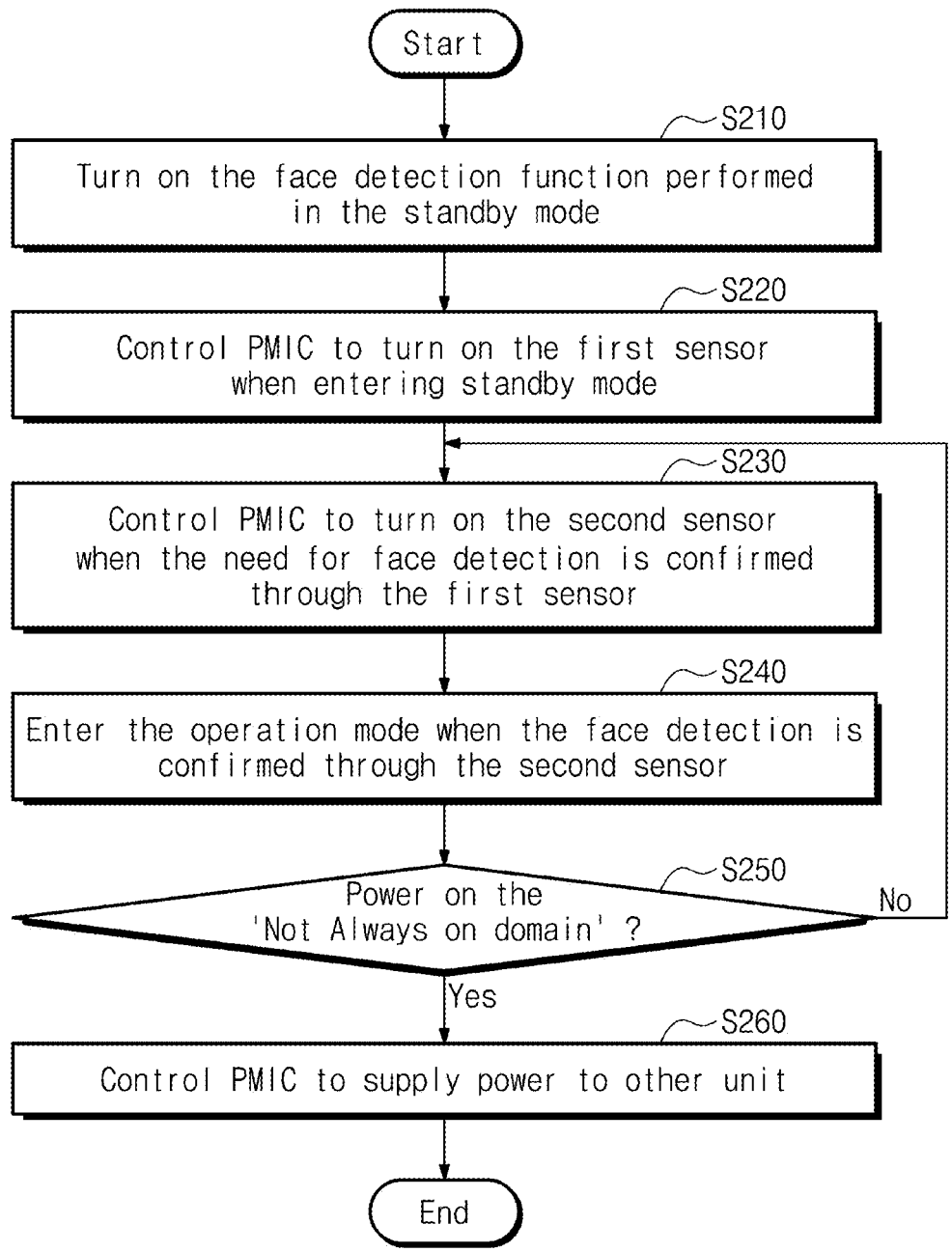

PROCESSING CIRCUITRY FOR OBJECT DETECTION IN STANDBY MODE, ELECTRONIC DEVICE, AND OPERATING METHOD THEREOF

CROSS-REFERENCE TO RELATED APPLICATIONS

This application claims priority under 35 U.S.C. § 119 to Korean Patent Application No. 10-2020-0099090 filed on Aug. 7, 2020, in the Korean Intellectual Property Office, the disclosures of which are incorporated by reference herein in their entireties.

BACKGROUND

Example embodiments of the inventive concepts described herein relate to processing circuitry for object detection, and more particularly, relate to processing circuitry configured to detect a face or a quick response (QR) code in a standby mode, an electronic device including the processing circuitry, and an operating method thereof.

Nowadays, an electronic device, which takes a photograph by using an image sensor, such as a digital camera, a digital camcorder, or a smartphone is being widely supplied. The electronic device may use not a film but an image sensor to make it possible to photograph and check figures of users in daily life more easily. Also, the electronic device may support a face detection function for distinguishing user's face from a background or an object for the purpose of taking a photograph of user's face more clearly.

An object detection function including the face detection function needs to be activated even in a standby state. For example, when the user wants to operate a smartphone in a standby mode or a power saving mode, without a separate input of the user, the smartphone may detect user's face to perform a face recognition or authentication operation. However, in the case where the image sensor and the face detection function are always on in the standby mode, a considerable lot of power may be consumed.

SUMMARY

Example embodiments provide a way to reduce power consumption in executing an object detection function in a standby state.

Example embodiments of the inventive concepts provide processing circuitry configured to perform face detection or QR code detection always without an input of a user in a standby mode and an electronic device including the same.

Also, example embodiments of the inventive concepts provide an operating method of an electronic device performing face detection or QR code detection always with lower power in a standby mode.

According to example embodiments, an electronic device may include a power supply, a first sensor that acquires first data including information about an external object, a second sensor that acquires second data including image information about the external object, and processing circuitry. The processing circuitry may include always-on domain processing circuitry configured to determine whether to need to perform face detection or QR code detection based on the first data and outputs a first control request signal of requesting a power supply to the second sensor based on a result of the determination and not-always-on domain processing circuitry configured to control the power supply in response to the first control request signal such that a power is supplied to the second sensor, wherein the always-on domain processing circuitry is configured to perform the face detection or the QR code detection based on the second data.

According to example embodiments, an operating method of an electronic device which includes an "Always On" domain continuously supplied with a power and present in processing circuitry may include acquiring first data including information about an external object through a first sensor, determining whether to need to perform face detection or QR code detection based on the first data, outputting a first control request signal of requesting a power supply to a second sensor based on a result of the determining of whether to need the face detection or the QR code detection, supplying a power to the second sensor in response to the first control request signal, acquiring second data including image information about the external object through the second sensor, performing the face detection or the QR code detection based on the second data, and controlling a power supply based on a result of the face detection or the QR code detection. The determining of whether to need the face detection or the QR code detection, the outputting of the first control request signal, and the performing of the face detection or the QR code detection may be performed in the always-on domain of the processing circuitry.

According to example embodiments, an application processor may include always-on domain processing circuitry configured to receive first data including information about an external object from a first sensor and determines whether to need to perform face detection or QR code detection based on the first data and receive second data including image information about the external object from a second sensor and performs the face detection or the QR code detection based on the second data, and not-always-on domain processing circuitry configured to control a power supply in response to a control request signal output from the always-on domain processing circuitry. The always-on domain processing circuitry may be always supplied with a power from the power supply.

BRIEF DESCRIPTION OF THE FIGURES

The above and other objects and features of the inventive concepts will become apparent by describing in detail example embodiments thereof with reference to the accompanying drawings.

FIG. 3 is a flowchart illustrating an operating method of a power management unit of FIG. 1.

DETAILED DESCRIPTION

Below, example embodiments of the inventive concepts may be described in detail and clearly to such an extent that an ordinary one in the art easily implements the inventive concepts.

In the detailed description or drawings, the terms "unit", "engine", "module", and the like or function blocks performing various operations may be implemented with software, firmware, a hardware circuit, or various combinations thereof.

Figure 1:
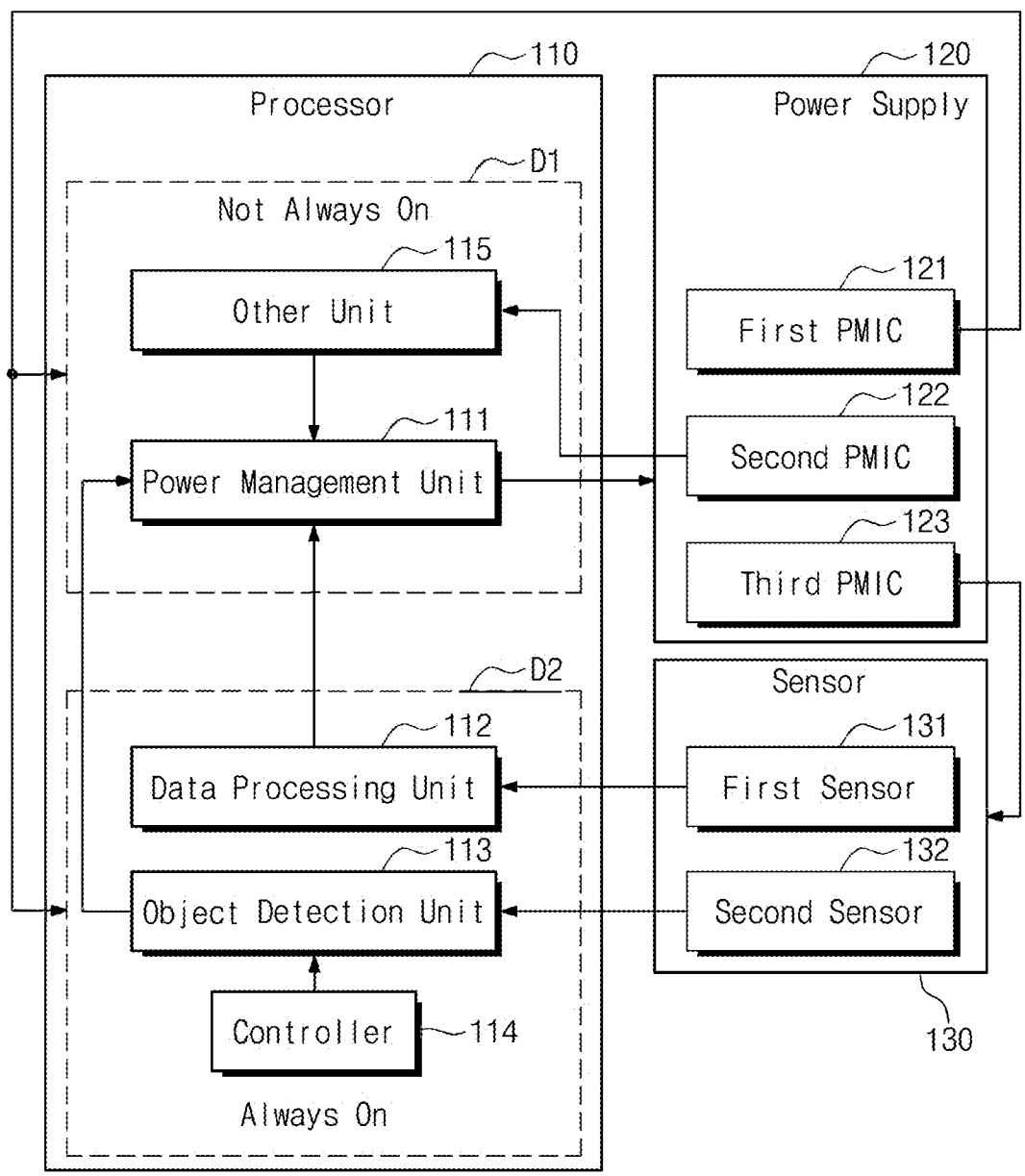
FIG. 1 is a block diagram of an electronic device according to example embodiments of the inventive concepts.

FIG. 1 is a block diagram of an electronic device according to example embodiments of the inventive concepts.

Referring to FIG. 1, an electronic device 100 according to example embodiments of the inventive concepts may include a processor 110, a power supplier 120, and a sensor 130. The electronic device 100 may perform a function for object detection. According to example embodiments, the electronic device 100 may perform a function for detecting a face of a user. According to example embodiments, the electronic device 100 may perform a function for detecting a QR code. The electronic device 100 may be included in at least one of a smartphone, a tablet personal computer (PC), a mobile phone, a video telephone, an electronic book reader, a desktop PC, a laptop PC, a netbook computer, a workstation, a personal digital assistant (PDA), a portable multimedia player (PMP), a Motion Picture Experts Group (MPEG-1 or MPEG-2) Audio Layer 3 (MP3) player, a mobile medical device, a camera, or a wearable device.

The electronic device 100 may acquire information about an external object through the sensor 130 and may determine whether to need to detect an object through the processor 110. In some example embodiments, the information about the external object may not include image information and may be acquired through any other low-power sensor except for an image sensor. The electronic device 100 may acquire image information about an external object through the sensor 130 based on a result of determining whether to need to detect an object. In some example embodiments, the image information may be acquired through an image sensor (e.g., a camera). The electronic device 100 may perform object detection through the processor 110, based on image information associated with an external object.

The processor 110 may include an always-on power domain that is always supplied with a power and may perform the following operations through the always-on power domain: determining whether to need to detect an object and detecting an object. An operation of the processor 110 including the always-on power domain may allow the electronic device 100 to detect an object with lower power even in a standby mode as well as an operation mode.

The processor 110 may control overall operations of the electronic device 100. The processor 110 may be electrically connected with the power supply 120 and the sensor 130 and may control operations of the power supply 120 and the sensor 130. The processor 110 may include a general-purpose processor. For example, the processor 110 may be a central processing unit (CPU) or an application processor (AP).

For example, the processor 110 may drive an operating system (OS) or an application to control a plurality of hardware or software components connected with the processor 110 and to process and compute a variety of data. The processor 110 may be implemented with a system on chip (SoC). According to example embodiments, the processor 110 may further include a graphic processing unit (GPU) and/or an image signal processor. The processor 110 may include a single processor core or may include a plurality of processor cores (or a multi-core). The processor 110 may process data stored in a memory and may execute programs stored therein. For example, the processor 110 may control a function(s) of the electronic device 100 by executing the programs stored in the memory.

The processor 110 may include a first domain D1 and a second domain D2. The first domain D1 may be a "Not Always On" domain that is selectively supplied with a power from the power supply 120. The second domain D2 may be an "Always On" domain that is always supplied with a power from the power supply 120. The processor 110 may include the second domain D2 being a portion that is always supplied with a power from the power supply 120 and maintains an on state.

The first domain D1 of the processor 110 may be supplied with a power from the power supply 120 in the operation mode. In the specification, the "operation mode" means a state where all functions of the electronic device 100 are enabled (or activated). The operation mode may also be referred to as an "operation mode". For example, the processor 110 may enable (or activate) a face detection function, a face recognition function, a biometric authentication function, a QR code detection function, and the like through any other unit 115 in the operation mode. In some example embodiments, all units in the first domain D1 may be supplied with a power from the power supply 120 and may maintain an on state.

In the standby mode, the first domain D1 of the processor 110 may be supplied with a minimum power from the power supply 120 or may not be supplied with a power. In the specification, the "standby mode" means a state where a function(s) minimally set in advance in the electronic device 100 is enabled (or activated). The standby mode may also be referred to as a "power saving mode". For example, the processor 110 may enable only an object detection function in the standby mode. In some example embodiments, the remaining units of the first domain D1 other than a power management unit 111 may not be supplied with a power from the power supply 120 and may be in an off state.

In some example embodiments, the power management unit 111 may be supplied with a minimum power from the power supply 120 in the standby mode. In the standby mode, the power management unit 111 may control a power-on/off of the first domain D1 in response to a signal output from the second domain D2. That is, the first domain D1 may be supplied with a given power only for an operation of the power management unit 111 from the power supply 120 in the standby mode. A first domain off state to be described below means a state where, in the standby mode, a power is not supplied to the other unit 115 of the first domain D1 and a given power is supplied only to the power management unit 111 of the first domain D1.

The second domain D2 of the processor 110 may be supplied with a power from the power supply 120 in the operation mode and the standby mode. The second domain D2 may perform the object detection function through a data processing unit 112 and an object detection unit 113. That is, through the second domain D2, the processor 110 may perform the object detection function even in the standby mode as well as the operation mode.

In the specification, below, for convenience of description, an object detection operation will be described with reference to a face detection operation, but the inventive concepts are not limited thereto. For example, the face detection operation to be described below may be understood as a QR code detection operation.

Referring to FIG. 1, the processor 110 may include the power management unit 111, the data processing unit 112, the object detection unit 113, a controller 114, and the other unit 115. The power management unit 111 and the other unit 115 may be included in the first domain D1, and the data processing unit 112, the object detection unit 113, and the controller 114 may be included in the second domain D2. Through the second domain D2, the processor 110 may detect an object in the standby mode without an input of the user.

The power management unit 111, the data processing unit 112, the object detection unit 113, the controller 114, and the other unit 115 may be implemented with one or more hardware devices. For example, the power management unit 111, the data processing unit 112, the object detection unit 113, the controller 114, and the other unit 115 may be implemented with a hardware circuit (e.g., an analog circuit and a logic circuit) for the purpose of performing operations to be described below. For example, the power management unit 111, the data processing unit 112, the object detection unit 113, the controller 114, and the other unit 115 may be implemented with a program code for the purpose of performing operations to be described below, and may be executed by one of a general-purpose processor, a workstation processor, an application processor, and the like. For example, the power management unit 111, the data processing unit 112, the object detection unit 113, the controller 114, and the other unit 115 may include a dedicated circuit (e.g., field programmable gate arrays (FPGA) or application specific integrated circuits (ASICs)) or a system on chip (SoC), which includes one or more processor cores.

One or more of the elements disclosed herein may include or be implemented in processing circuitry (one or more circuitries) such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The power management unit 111 may be electrically connected with the power supply 120 and may control the power supply 120. The power management unit 111 may receive a control request signal associated with the power supply 120 from at least one of the data processing unit 112, the object detection unit 113, and the other unit 115. The power management unit 111 may control the power supply 120 in response to the control request signal. Table 1 below shows various parameters that are controlled by the power management unit 111 in the standby mode or the operation mode.

TABLE 1

|  | Standby mode | Operation mode |
| --- | --- | --- |
| Operating voltage of second domain D2 | Equal to or less than 0.51 V | Equal to or less than 0.81 V |
| Operating frequency of second domain D2 | Equal to or less than 50 MHz | Equal to or less than 1 GHz |
| Power supply to any other unit 115 | Blocking | Supply |
| Operating state of first sensor 131 | ON | ON, OFF |
| Operating state of second sensor 132 | ON, standby | ON, OFF, standby |
| Storage target for second data DATA_2 | SRAM | SRAM or DRAM |

Referring to Table 1 above, the power management unit 111 may control the power supply 120 such that an operating voltage and an operating frequency of the second domain D2 become smaller in the standby mode than in the operation mode. In the standby mode, the power management unit 111 may maintain the operating voltage of the second domain D2 at 0.51 V or less and the operating frequency of the second domain D2 at 50 MHz or lower. In the operation mode, the power management unit 111 may maintain the operating voltage of the second domain D2 at 0.81 V or less and the operating frequency of the second domain D2 at 1 GHz or lower. That is, the power management unit 111 may maintain the operating voltage and the operating frequency of the second domain D2 to be lower in the standby mode than in the operation mode.

Depending on a mode, the power management unit 111 may control a power supply to the other unit 115, a first sensor 131, and a second sensor 132. The power management unit 111 may block the power supply to the other unit 115 in the standby mode and may supply a power to the other unit 115 in the operation mode. The power management unit 111 may supply a power to the first sensor 131 in the standby mode; in the operation mode, the power management unit 111 may supply a power to the first sensor 131 or may block a power supply to the first sensor 131. In the standby mode, the power management unit 111 may supply a power to the second sensor 132 or may allow the second sensor 132 to maintain a standby state; in the operation mode, the power management unit 111 may block a power supply to the second sensor 132 or may allow the second sensor 132 to maintain the standby state. Second data that the second sensor 132 acquires may be stored in a memory, for example, an SRAM in the second domain D2 in the standby mode and may be stored in the SRAM, or an internal memory of the processor 110, or an external DRAM in the operation mode.

The power management unit 111 may receive a setting signal of requesting a turn-on of a face detection function to be performed in the standby mode from the other unit 115. In some example embodiments, the other unit 115 may be an input unit or an interface unit. The input unit or the interface unit may receive the setting signal from the user. In entering the standby mode in response to the setting signal, the power management unit 111 may control the power supply 120 such that the first domain D1 is turned off, the first sensor 131 is turned on, and the second sensor 132 is changed to or maintained in the standby state. The standby state of the second sensor 132 that is a state where a minimum power is supplied from the power supply 120 may mean a power saving state or a state of waiting for usage in a low-power state.

The power management unit 111 may receive a first control request signal according to a need for face detection from the data processing unit 112. The power management unit 111 may control the power supply 120 in response to the first control request signal such that the second sensor 132 is turned on.

The power management unit 111 may receive a second control request signal according to the execution of the face detection function from the object detection unit 113. The power management unit 111 may control the power supply 120 in response to the second control request signal so as to enter the operation mode.

The power management unit 111 may receive a third control request signal according to the execution of the face detection function from the object detection unit 113. The power management unit 111 may control the power supply 120 in response to the third control request signal such that the second sensor 132 switches from an on state to the standby state.

The data processing unit 112 may receive first data from the first sensor 131 and may determine whether to need to detect a face based on the first data. For example, the data processing unit 112 may receive data on a distance from a distance sensor to the user; when the distance is equal to or smaller than a set distance, the data processing unit 112 may determine that there is a need to detect user's face. For example, the data processing unit 112 may receive data on illuminance from an illumination sensor; when the illuminance is equal to or smaller than a set value, the data processing unit 112 may determine that there is a need to detect user's face. For example, the data processing unit 112 may receive data on a change of heat from a thermal sensor; when the change of heat is sensed, the data processing unit 112 may determine that there is a need to detect user's face.

When it is determined based on the first data that there is a need to detect user's face, the data processing unit 112 may transmit a control request signal of requesting a turn-on of the second sensor 132 to the power management unit 111. When it is determined based on the first data that there is no need to detect user's face, the data processing unit 112 may continue to receive the first data from the first sensor 131.

The object detection unit 113 may receive the second data from the second sensor 132 and may perform face detection based on the second data. For example, the object detection unit 113 may receive image data of a target (or an object) in front of a mobile terminal or behind the mobile terminal from an image sensor and may detect user's face. In the specification, below, the object detection unit 113 may operate as a face detection unit for performing face detection or may operate a QR code detection unit for performing QR code detection.

The object detection unit 113 may determine whether data on the face detected based on the second data coincide with face data stored in advance. When the data on the detected face coincide with the stored face data, the object detection unit 113 may generate a control request signal for the entering to the operation mode. When the data on the detected face do not coincide with the stored face data, the object detection unit 113 may generate a control request signal for changing a state of the second sensor 132 to the standby state.

The object detection unit 113 may be controlled by the controller 114. The controller 114 may be electrically connected with the object detection unit 113 and may control the object detection unit 113. The controller 114 may be placed in the second domain D2 and may be placed within a sensor hub (not illustrated). The controller 114 may be implemented with a CPU.

The power supply 120 may be connected with a battery (not illustrated) to supply a power to the electronic device 100. The power supply 120 may supply a power to each component of the electronic device 100 in response to a control signal of the power management unit 111. The power supply 120 may include one or more power management integrated circuits (PMICs). The PMIC may have a wired charging manner and/or a wireless charging manner. The wireless charging manner may include, for example, a magnetic resonance manner, a magnetic induction manner, an electromagnetic manner, or the like and may further include an additional circuit for wireless charging, for example, a coil loop, a resonant circuit, a rectifier, or the like.

The power supply 120 may include at least one of a first PMIC 121, a second PMIC 122, and a third PMIC 123. The first PMIC 121 may supply a power to the processor 110. The first PMIC 121 may selectively supply a power to the first domain D1 and may always supply a power to the second domain D2. The power supply to the first domain D1 may mean a power supply to each unit in the first domain D1, and the power supply to the second domain D2 may mean a power supply to each unit in the second domain D2.

The second PMIC 122 may supply a power to the other unit 115. When a power is supplied to the first domain D1, the second PMIC 122 may supply a power to the other unit 115 independently of the first PMIC 121. The other unit 115 may perform a function requiring large power consumption and may reduce power consumption through an on/off control in the operation mode.

The third PMIC 123 may supply a power to the sensor 130. The third PMIC 123 may supply a power to the first sensor 131 for the purpose of determining whether to need to detect a face and may supply a power to the second sensor 132 for the purpose of performing face detection. The inventive concepts are not limited to the example where the power supply 120 includes the first PMIC 121, the second PMIC 122, and the third PMIC 123. For example, the power supply 120 may further include a fourth PMIC for supplying a power to an additional unit.

The sensor 130 may measure a physical quantity or may detect an operation state of the electronic device 100; the sensor 130 may convert the measured or detected information to an electrical signal. The sensor 130 may include the first sensor 131 and the second sensor 132. The first sensor 131 may acquire the first data on an external object. The first data may not include image data. That is, the first sensor 131 may not include an image sensor. For example, the first sensor 131 may include at least one of a distance sensor, a gyro sensor, a magnetic sensor, an acceleration sensor, a proximity sensor, a biometric sensor, a temperature/humidity sensor, an illumination sensor, a thermal sensor, an ultraviolet (UV) sensor, and an infrared (IR) sensor.

The second sensor 132 may acquire the second data on the external object. The second data may include image data. That is, the second sensor 132 may include an image sensor. For example, the second sensor 132 may include at least one of a charge-coupled device (CCD) sensor, a complementary metal-oxide-semiconductor (CMOS) sensor, and an IR light sensor. For example, the second sensor 132 may include a camera.

Figure 2:
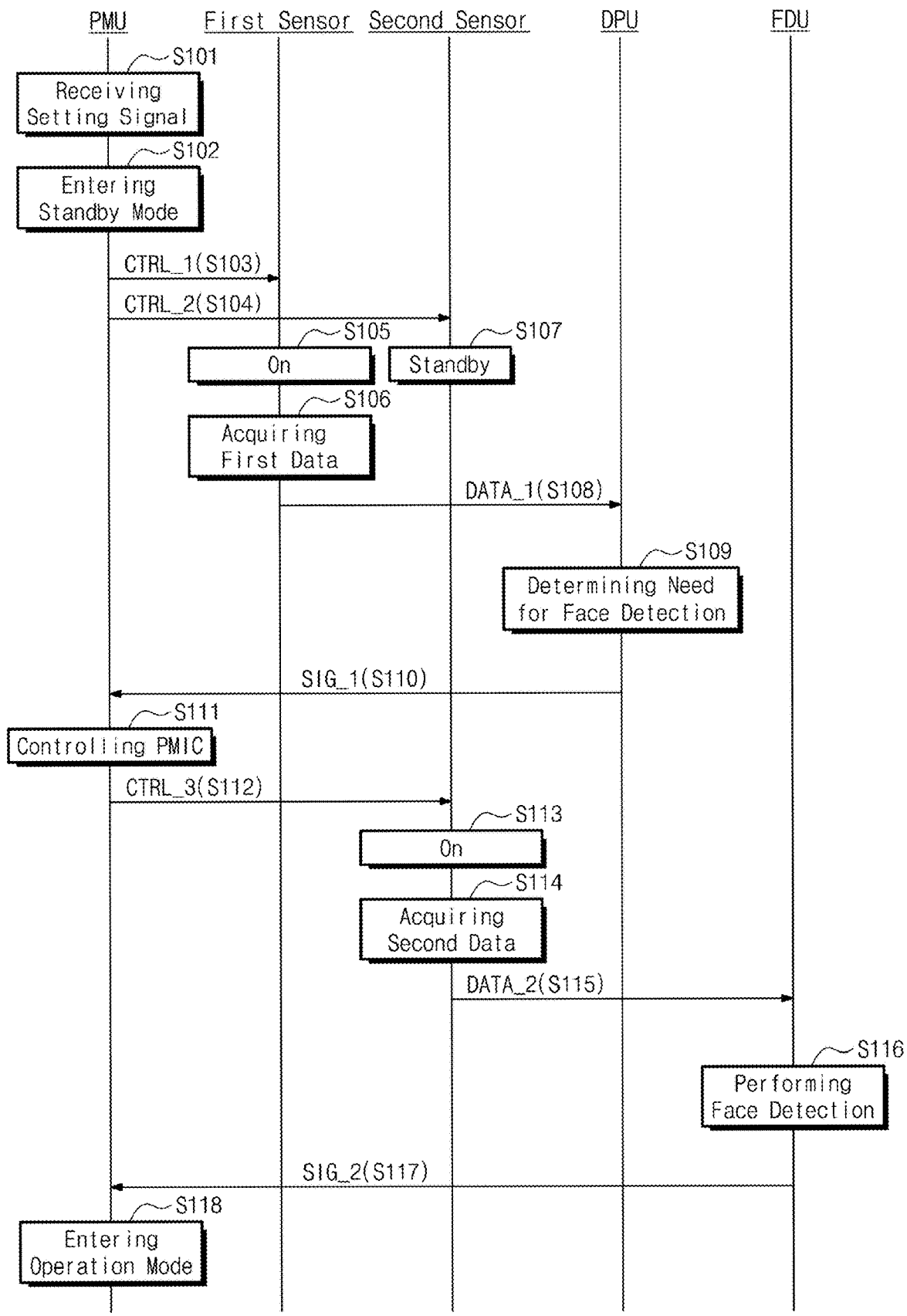
FIG. 2 is a flowchart illustrating an operating method of an electronic device according to example embodiments of the inventive concepts.

FIG. 2 is a flowchart illustrating an operating method of an electronic device according to example embodiments of the inventive concepts.

Referring to FIGS. 1 and 2, an operating method of the electronic device 100 according to example embodiments of the inventive concepts will be described by using operations of the power management unit 111, the data processing unit 112, the object detection unit 113, the first sensor 131, and the second sensor 132 and signal flows therebetween. In operation S101, the power management unit 111 may receive a setting signal. For example, the power management unit 111 may receive the setting signal of turning on the face detection function to be performed in the standby mode from the user through an input unit or an interface unit.

In operation S102, the power management unit 111 may enter the standby mode after receiving the setting signal. The power management unit 111 may enter the standby mode under a given condition. For example, the power management unit 111 may enter the standby mode in response to a signal indicating the entering to the standby mode when any function of the electronic device 100 is not enabled during a given time. For example, the power management unit 111 may enter the standby mode in response to the signal indicating the entering to the standby mode when a battery level is equal to or lower than a given level. The signal indicating the entering to the standby mode is not limited thereto. For example, the signal indicating the entering to the standby mode may be generated whenever there is a need to reduce power consumption of the electronic device 100.

After entering the standby mode, the power management unit 111 may transmit a first control signal CTRL_1 to the first sensor 131 in operation S103 and may transmit a second control signal CTRL_2 to the second sensor 132 in operation S104. The first control signal CTRL_1 may be a signal indicating a power supply to the first control signal CTRL_1, and the second control signal CTRL_2 may be a signal allowing the second sensor 132 to change to the standby state or to maintain the standby state. The power management unit 111 may transmit the first control signal CTRL_1 and the second control signal CTRL_2 to the first sensor 131 and the second sensor 132 through the power supply 120, respectively.

In operation S105, the first sensor 131 may turn on a power in response to the first control signal CTRL_1. In operation S106, the first sensor 131 thus powered on may acquire first data DATA_1. The first data DATA_1 may include information about an external object. The first data DATA_1 may not include image information about the external object. For example, the first data DATA_1 may include at least one of distance information, illuminance information, thermal information, temperature information, speed information, acceleration information, biometric information, color information, and pressure information about an external object.

In operation S107, the second sensor 132 may enter the standby state in response to the second control signal CTRL_2. The standby state of the second sensor 132 may mean a power saving state or a state of waiting for usage in a low-power state. The second data DATA_2 may include image information about the external object.

In operation S108, the first sensor 131 may transmit the first data DATA_1 to the data processing unit 112. In operation S109, the data processing unit 112 may determine whether to need to detect a face, based on the first data DATA_1.

The data processing unit 112 may determine whether to need to detect a face based on a condition that is variable depending on a kind of the first sensor 131. For convenience of description, whether to need to detect a face may be determined under the assumption that the first sensor 131 to be described below is a distance sensor. The data processing unit 112 may receive information about a distance from the first sensor 131 of the electronic device 100 to the user. When the distance indicated by the received information is equal to or smaller than a given distance, the data processing unit 112 may determine that there is a need to detect a face.

When it is determined that there is a need to detect a face, in operation S110, the data processing unit 112 may output a first control request signal SIG_1 associated with the power supply 120. The data processing unit 112 may transmit the first control request signal SIG_1 to the power management unit 111. The first control request signal SIG_1 may be a signal for turning on a power of the second sensor 132. In operation S111, the power management unit 111 may control the power supply 120 in response to the first control request signal SIG_1.

In operation S112, the power management unit 111 may transmit a third control signal CTRL_3 to the second sensor 132. The power management unit 111 may transmit the third control signal CTRL_3 to the second sensor 132 through the power supply 120. The third control signal CTRL_3 may be a signal for supplying a power to the second sensor 132. Alternatively, the third control signal CTRL_3 may be a signal for increasing the amount of power to be supplied to the second sensor 132.

In operation S113, the second sensor 132 may turn on a power in response to the third control signal CTRL_3. In operation S114, the second sensor 132 thus powered on may acquire the second data DATA_2. The second data DATA_2 may include information about the external object. For example, the second data DATA_2 may include image information about the external object.

In operation S115, the second sensor 132 may transmit the second data DATA_2 to the object detection unit 113. In operation S116, the object detection unit 113 may perform face detection based on the second data DATA_2. The object detection unit 113 may determine whether data on the detected face coincide with face data stored in advance. The object detection unit 113 may determine whether the data on the detected face coincide with the stored face data, based on a neural network model.

When it is determined that the data on the detected face coincide with the stored face data, in operation S117, the object detection unit 113 may output a second control request signal SIG_2 associated with the power supply 120. The object detection unit 113 may transmit the second control request signal SIG_2 to the power management unit 111. The second control request signal SIG_2 may be a signal for the entering to the operation mode.

In operation S118, the power management unit 111 may control the power supply 120 for the purpose of entering the operation mode. The power management unit 111 may control the power supply 120 in response to the second control request signal SIG_2 such that a power is supplied to the first domain D1. The entering to the operation mode may be made when a power supply to the first domain D1 is completed. After entering the operation mode, the power management unit 111 may allow the power supply 120 to supply a power to each unit in the processor 110 or to block the power supply thereto.

FIG. 3 is a flowchart illustrating an operating method of a power management unit of FIG. 1.

Referring to FIGS. 1 and 3, the power management unit 111 according to example embodiments of the inventive concepts may control the power supply 120 in response to a control request signal received from at least one of the data processing unit 112, the object detection unit 113, and the other unit 115. The electronic device 100 may operate while the power management unit 111 receives the setting signal of the user from the other unit 115.

In operation S210, the power management unit 111 may turn on the face detection function to be performed in the standby mode in response to the setting signal. In operation S220, the power management unit 111 may control the power supply 120 such that the first sensor 131 is turned on when entering the standby mode. In detail, the power management unit 111 may supply a power to the first sensor 131 by controlling the third PMIC 123 supplying a power to the sensor 130. Alternatively, when entering the standby mode, the power management unit 111 may maintain the second sensor 132 at the standby state or may change a state of the second sensor 132 to the standby state. In detail, by controlling the third PMIC 123 supplying a power to the sensor 130, the power management unit 111 may maintain the second sensor 132 at the standby state or may change a state of the second sensor 132 to the standby state.

When entering the standby mode, the power management unit 111 may control the power supply 120 such that a power supply to the first domain D1 is blocked or a minimum power is supplied to the first domain D1. In detail, the power management unit 111 may turn off a power of the first domain D1 by controlling the first PMIC 121 supplying a power to the processor 110.

When a need to perform face detection is confirmed through the first sensor 131 and the data processing unit 112 thus powered on, in operation S230, the power management unit 111 may control the power supply 120 such that the second sensor 132 is turned on. In detail, the power management unit 111 may supply a power to the second sensor 132 by controlling the third PMIC 123 supplying a power to the sensor 130. A process in which the data processing unit 112 determines whether to need to detect a face will be described with reference to FIGS. 4A to 5.

When face detection is confirmed through the second sensor 132 and the object detection unit 113 thus powered on, in operation S240, the power management unit 111 may enter the operation mode. In detail, the power management unit 111 may supply a power to the first domain D1 by controlling the first PMIC 121 supplying a power to the processor 110. A process in which the object detection unit 113 detects a face will be described with reference to FIG. 6.

In operation S250, the power management unit 111 may determine whether a power is supplied to the first domain D1 being the "Not Always On". When it is determined that a power is supplied to the first domain D1, the power management unit 111 may determine the entering to the operation mode (e.g., the power management unit 111 may perform operation S260). When it is determined that a power is not supplied to the first domain D1, the power management unit 111 may return to operation S230.

In operation S260, the power management unit 111 may control the power supply 120 such that a power is supplied to the other unit 115. In detail, the power management unit 111 may supply a power to the other unit 115 by controlling the second PMIC 122. The other unit 115 may include a neural processing unit (NPU) to be described below. The other unit 115 may further include a face recognition unit, a biometric authentication unit, a communication unit, an input/output unit, or the like.

Figure 4A:
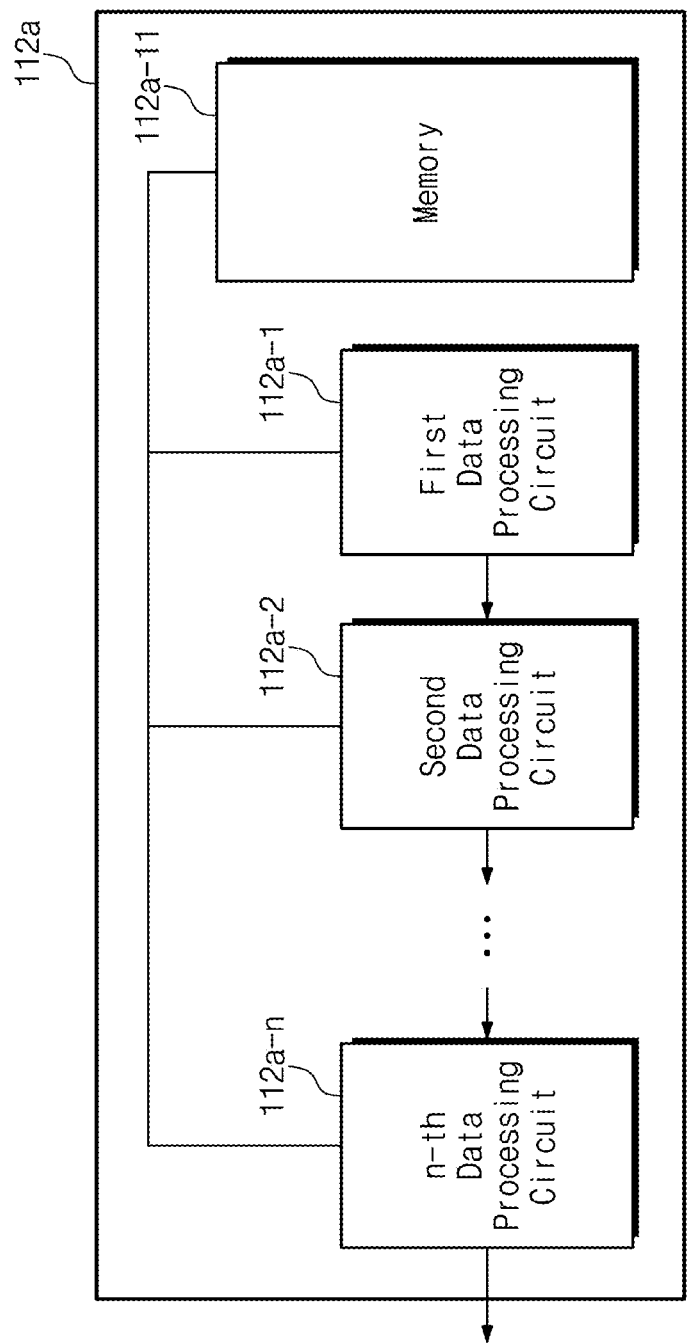
FIGS. 4A and 4B are block diagrams of a data processing unit of FIG. 1.
Figure 4B:
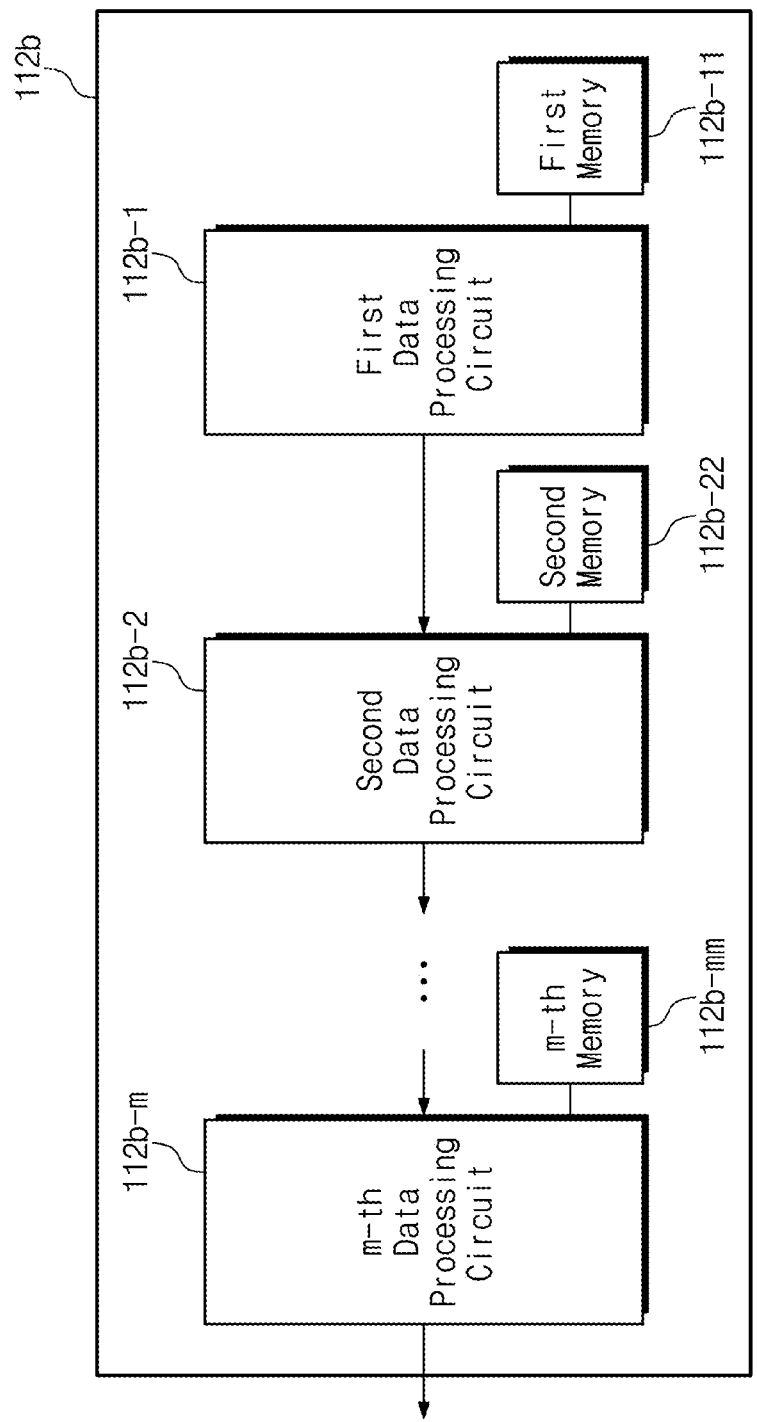

FIGS. 4A and 4B are block diagrams of a data processing unit of FIG. 1.

Referring to FIGS. 1, 4A, and 4B, the data processing unit 112 may include one or more data processing circuits and a memory. The data processing circuits may be implemented in a hierarchical structure and may determine whether to need to detect a face with different accuracy and different power consumption.

Referring to FIG. 4A, a data processing unit 112a may include first to n-th data processing circuits 112a-1 to 112a-n and a memory 112a-11. The first data processing circuit 112a-1 may perform first determination on whether to need to detect a face. That is, the first data processing circuit 112a-1 may determine whether the first data DATA_1 satisfy a first condition, based on the first data DATA_1 stored in the memory 112a-11.

When a result of the first determination has reliability of a reference value or less, the second data processing circuit 112a-2 may perform second determination on whether to need to detect a face. That is, the second data processing circuit 112a-2 may determine whether the first data DATA_1 satisfy a second condition, based on the first data DATA_1 stored in the memory 112a-11. The second condition may be identical to or different from the first condition. The accuracy and power consumption of the second determination may be higher than the accuracy and power consumption of the first determination.

The n-th data processing circuit 112a-n may perform n-th determination on whether to need to detect a face. The accuracy and power consumption of the n-th determination may be higher than the accuracy and power consumption of (n−1)-th determination. When a result of the n-th determination has reliability exceeding the reference value, the data processing unit 112 may determine that there is a need to perform face detection. The data processing unit 112a may transmit the first control request signal SIG_1 to the power management unit 111 based on the determination indicating that there is a need to perform face detection.

When the result of the n-th determination has reliability of the reference value or less, the data processing unit 112 may determine that there is no need to perform face detection. The data processing unit 112a may receive new first data DATA_1 based on the determination indicating that there is no need to perform face detection.

The memory 112a-11 may be implemented with an SRAM. The memory 112a-11 may be connected with the first data processing circuit 112a-1, the second data processing circuit 112a-2, and the n-th data processing circuit 112a-n. That is, the plurality of data processing circuits 112a-1 to 112a-n may share the memory 112a-11. As the data processing unit 112a is implemented such that the data processing circuits 112a-1 to 112a-n share the memory 112a-11, the area of a hardware module in which the data processing unit 112a is implemented may decrease.

Referring to FIG. 4B, a data processing unit 112b may include first to m-th data processing circuits 112b-1 to 112b-m and first to m-th memories 112b-11 to 112b-mm. The operations of the first data processing circuit 112a-1, the second data processing circuit 112a-2, and the n-th data processing circuit 112a-n of FIG. 4A may be applied to the first to m-th data processing circuits 112b-1 to 112b-m except that the first to m-th data processing circuits 112b-1 to 112b-m determine whether to need to perform face detection based on data stored in the first to m-th memories 112b-11 to 112b-mm.

Each of the first memory 112b-11, the second memory 112b-22, and the m-th memory 112b-mm may be implemented with an SRAM. The first memory 112b-11, the second memory 112b-22, and the m-th memory 112b-mm may be respectively connected with the first data processing circuit 112b-1, the second data processing circuit 112b-2, and the m-th data processing circuit 112b-m. That is, the first data processing circuit 112b-1, the second data processing circuit 112b-2, and the m-th data processing circuit 112b-m may use the first memory 112b-11, the second memory 112b-22, and the m-th memory 112b-mm, independently of each other. By using the memories 112b-11, 112b-22, and 112b-mm respectively dedicated for the data processing circuits 112b-1, 112b-2, and 112b-m, a processing speed of the data processing unit 112b may be improved.

Although not illustrated in drawings, some of a plurality of data processing circuits may share a memory, and each of the remaining data processing circuits of the plurality of data processing circuits may use a dedicated memory.

Figure 5:
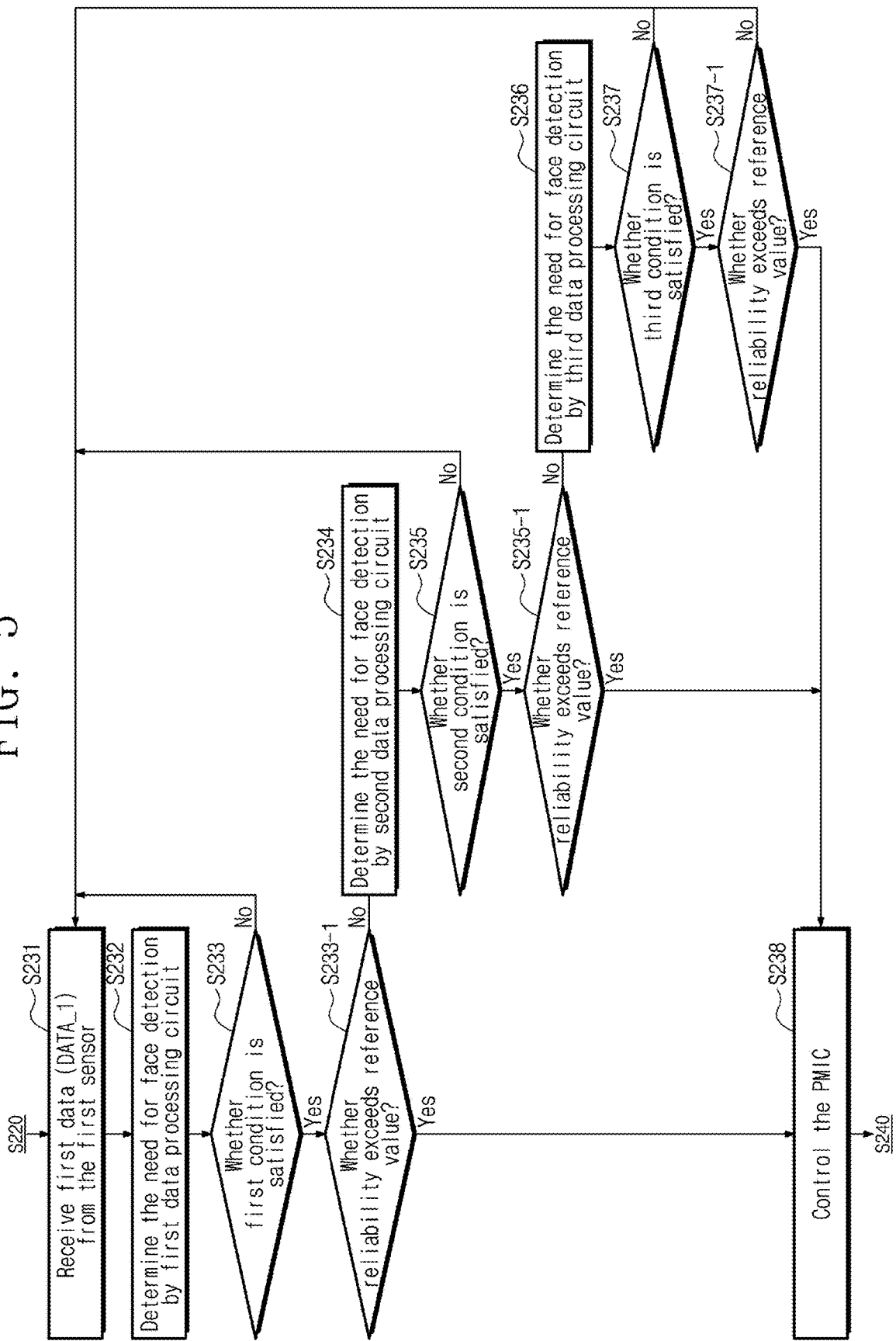
FIG. 5 is a flowchart illustrating an operation in which a data processing unit of FIG. 4A or 4B determines whether to need to perform face detection.

FIG. 5 is a flowchart illustrating an operation in which a data processing unit of FIG. 4A or 4B determines whether to need to perform face detection.

Referring to FIGS. 3 to 5, in operation S230, when a need to perform face detection is confirmed through the first sensor 131, the power management unit 111 may control the power supply 120 such that a power is supplied to the second sensor 132. In detail, in operation S231, the data processing unit 112 may receive the first data DATA_1 from the first sensor 131. The data processing unit 112 may be the data processing unit 112a of FIG. 4A, the data processing unit 112b of FIG. 4B, or a combination thereof.

Below, for convenience of description, it is assumed that the data processing unit 112 corresponds to the data processing unit 112a in which a memory is shared and "n" is 3. However, in the data processing unit 112, a way to occupy a memory and the number of data processing circuits are not limited thereto. Referring to FIGS. 4A and 5, the data processing unit 112a may include the first data processing circuit 112a-1, the second data processing circuit 112a-2, and a third data processing circuit 112a-3.

In operation S232, the first data processing circuit 112a-1 may perform first determination on whether to need to perform face detection, based on the first data DATA_1. In operation S233, the first data processing circuit 112a-1 may determine whether the first data DATA_1 satisfy a first condition (e.g., may perform first determination). For example, the first data DATA_1 may correspond to a distance from the electronic device 100 to the user, and the first condition may be for determining whether the distance is equal to or less than a first reference. The first data processing circuit 112a-1 may determine whether the distance to the user is equal to or less than the first reference. When the distance to the user exceeds the first reference, the data processing unit 112a may repeat the process of receiving the first data DATA_1 from the first sensor 131. That is, when it is determined that the first data DATA_1 do not satisfy the first condition, the first data processing circuit 112a-1 may return to operation S231.

When a result of the first determination indicates that the first data DATA_1 satisfy the first condition, in operation S233-1, the first data processing circuit 112a-1 may determine whether reliability of the first determination result exceeds a reference value. When the reliability of the first determination result exceeds the reference value, the first data processing circuit 112a-1 may generate the first control request signal SIG_1. Operation S233-1 may be performed by the second data processing circuit 112a-2 as well as the first data processing circuit 112a-1.

When the distance to the user is equal to or less than the first reference and the reliability of the first determination is equal to or less than the reference value, in operation S234, the second data processing circuit 112a-2 may perform second determination on whether to need to perform face detection, based on the first data DATA_1. In operation S235, the second data processing circuit 112a-2 may determine whether the first data DATA_1 satisfy a second condition. For example, the first data DATA_1 may correspond to a distance from the electronic device 100 to the user, and the second condition may be for determining whether the distance is equal to or less than a second reference. The second data processing circuit 112a-2 may determine whether the distance to the user is equal to or less than the second reference. The second reference may be identical to or different from the first reference. When the distance to the user exceeds the second reference, the data processing unit 112a may repeat the process of receiving the first data DATA_1 from the first sensor 131. That is, when it is determined that the first data DATA_1 do not satisfy the second condition in operation S235, the operation S231 may be repeated.

When a result of the second determination indicates that the first data DATA_1 satisfy the second condition, in operation S235-1, the second data processing circuit 112a-2 may determine whether reliability of the second determination result exceeds the reference value. When the reliability of the second determination result exceeds the reference value, the second data processing circuit 112a-2 may generate the first control request signal SIG_1. Operation S235-1 may be performed by the third data processing circuit 112a-3 as well as the second data processing circuit 112a-2.

The amount of power consumption of the second data processing circuit 112a-2 necessary for the second determination may be greater than the amount of power consumption of the first data processing circuit 112a-1 necessary for the first determination. However, the accuracy of the second determination may be higher than the accuracy of the first determination. As the data processing unit 112a is implemented in a hierarchical structure in which the first determination is made with lower power consumption and lower accuracy and the second determination is then made with large power consumption and high accuracy, the accuracy of the face detection process may effectively increase, and power consumption may be effectively reduced or minimized. This may be applied to third determination to be described below.

When the distance to the user is equal to or less than a second reference and the reliability of the second determination is equal to or less than the reference value, in operation S236, the third data processing circuit 112a-3 may perform third determination on whether to need to perform face detection, based on the first data DATA_1. In operation S237, the third data processing circuit 112a-3 may determine whether the first data DATA_1 satisfy a third condition. When it is determined that the first data DATA_1 do not satisfy the third condition, the third data processing circuit 112a-3 may return to operation S231.

When a result of the third determination indicates that the first data DATA_1 satisfy the third condition, in operation S237-1, the third data processing circuit 112a-3 may determine whether reliability of the third determination result exceeds the reference value. When the reliability of the third determination result exceeds the reference value, the third data processing circuit 112a-3 may generate the first control request signal SIG_1. When the third determination result has reliability of the reference value or less, the third data processing circuit 112a-3 may determine that there is no need to perform face detection and may return to operation S231. Operation S237-1 may be omitted. In the case where operation S237-1 is omitted, the third data processing circuit 112a-3 may generate the first control request signal SIG_1 based on the third determination result indicating that the first data DATA_1 satisfy the third condition.

In operation S238, the power management unit 111 may control the power supply 120 in response to the first control request signal SIG_1 such that a power is supplied to the second sensor 132. The second sensor 132 may change from the standby state to a power-on state and may acquire the second data DATA_2.

Figure 6:
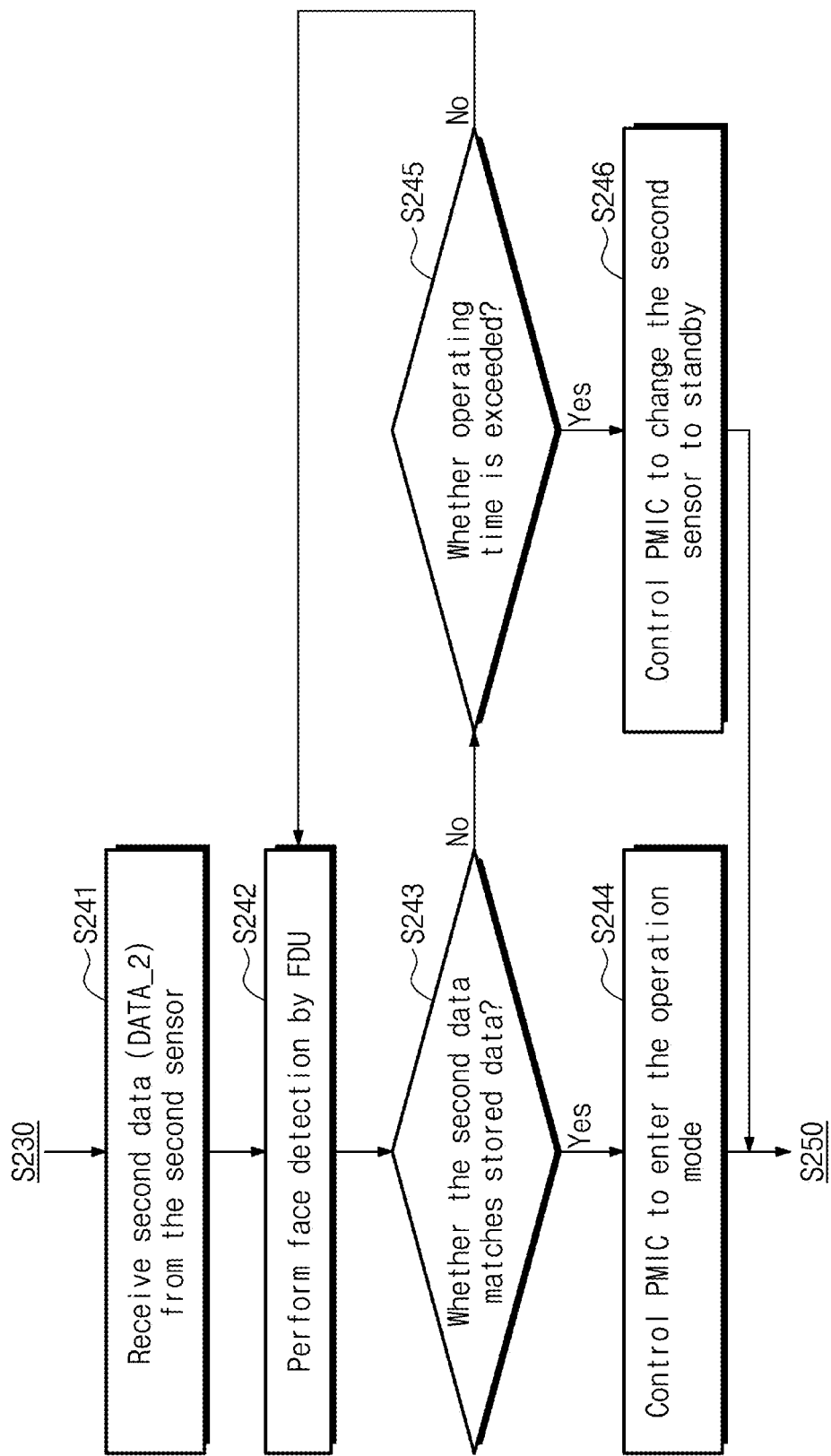
FIG. 6 is a flowchart illustrating an operation in which an object detection unit of FIG. 1 performs face detection.

FIG. 6 is a flowchart illustrating an operation in which an object detection unit of FIG. 1 performs face detection.

Referring to FIGS. 1 and 6, when face detection is confirmed through the second sensor 132, in operation S240, the power management unit 111 may allow the power supply 120 to enter the operation mode. In detail, in operation S241, the object detection unit 113 may receive the second data DATA_2 from the second sensor 132. The object detection unit 113 may include an SRAM that stores the second data DATA_2 received from the second sensor 132.

In operation S242, the object detection unit 113 may perform face detection based on the neural network model. The object detection unit 113 may be controlled by the controller 114 included in the second domain D2. The object detection unit 113 may be implemented together with the separate controller 114 to perform face detection, thus performing face detection stably and accurately even in the standby mode.

In operation S243, the object detection unit 113 may analyze data on a face detected based on the neural network model and may determine whether the data on the detected face coincide with face data stored in advance. A way to analyze face information may include detecting at least one face area of an image being photographed through a camera module, performing macro photography (or close photography) on the at least one face area, and analyzing the macro-photographed face area depending on at least one analysis item.

When it is determined that the analyzed face data coincide with the stored face data, the object detection unit 113 may transmit the second control request signal SIG_2 of requesting the power management unit 111 to enter the operation mode. In operation S244, in response to the second control request signal SIG_2, the power management unit 111 may allow the power supply 120 to enter the operation mode.

The power management unit 111 may control the first PMIC 121 to supply a power to the first domain D1. The entering to the operation mode may mean that a power is supplied to the first domain D1 being the "Not Always On". After entering the operation mode, the power management unit 111 may control the power supply 120 such that a power is supplied to the other unit 115 depending on a necessary function.

When it is determined that the analyzed face data do not coincide with the stored face data, the object detection unit 113 may check a time (hereinafter referred to as a "face detection operating time") when the face detection is performed. In operation S245, the object detection unit 113 may determine whether the face detection operating time exceeds a given operating time. When it is determined that the face detection operating time does not exceed the given operating time, the object detection unit 113 may repeatedly perform the face detection operation. When it is determined that the face detection operating time exceeds the given operating time, in operation S246, the object detection unit 113 may transmit a third control request signal for requesting a change of the second sensor 132 from the on state to the standby state. The power management unit 111 may control the power supply 120 in response to the third control request signal such that the amount of power being supplied the second sensor 132 decreases.

Figure 7:
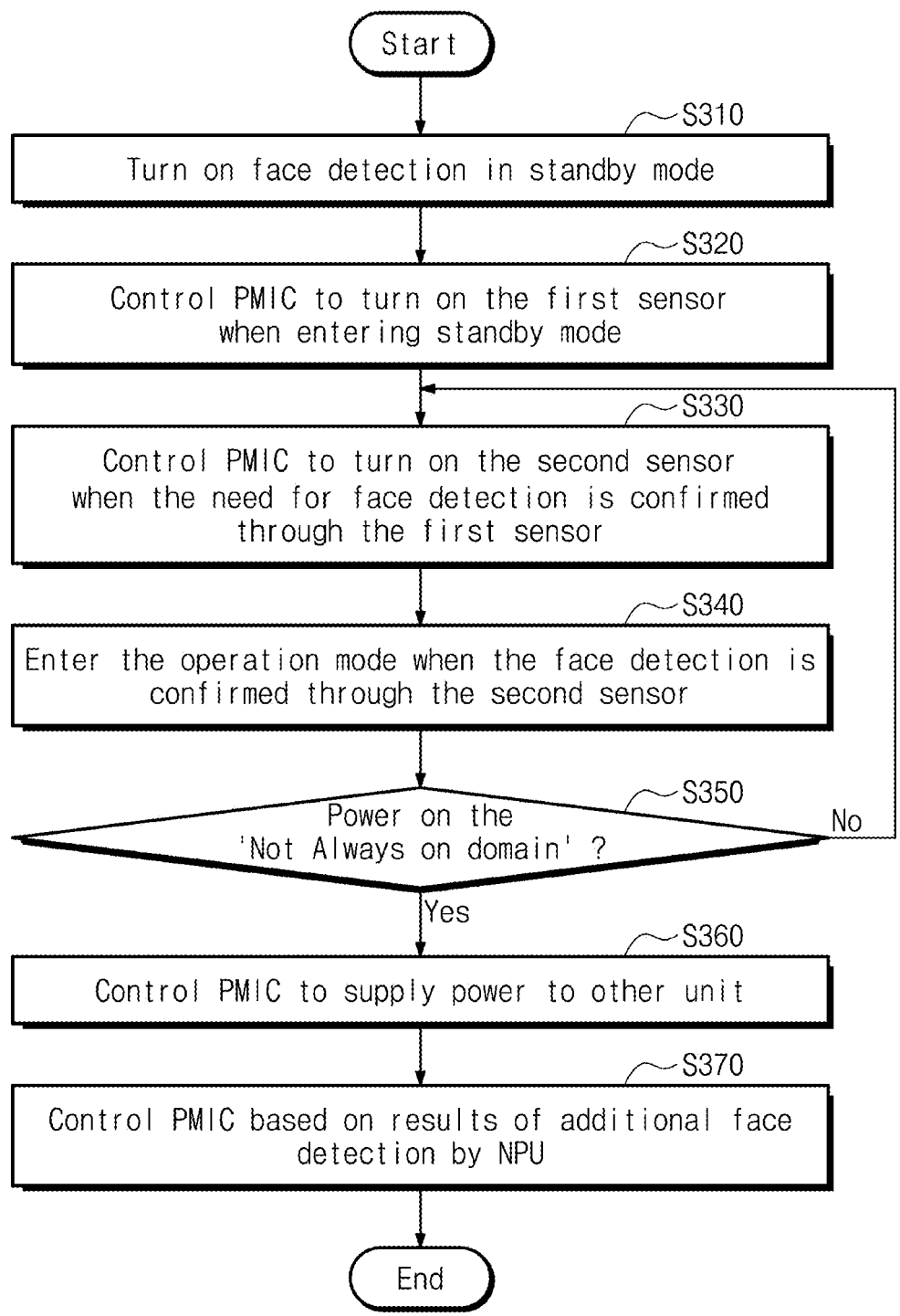
FIG. 7 is a flowchart illustrating example embodiments of an operating method of an electronic device of FIG. 1.

FIG. 7 is a flowchart illustrating example embodiments of an operating method of an electronic device of FIG. 1.

Referring to FIGS. 1 and 7, the electronic device 100 may perform operation S310 to operation S350. Operation S310 to operation S350 are similar to operation S210 to operation S250 of FIG. 2, and thus, additional description will be omitted to avoid redundancy.

In operation S360, the power management unit 111 may control the power supply 120 depending on a result of face detection performed by a neural network processing unit. The neural network processing unit may additionally perform face detection in the operation mode. The neural network processing unit may be an example embodiment of the other unit 115. When a power of the first domain D1 is turned on, the neural network processing unit may additionally perform face detection based on a deep learning algorithm. According to example embodiments, the neural network processing unit may be supplied a separate power after entering the operation mode. The power management unit 111 may control the second PMIC 122 to supply a power to the neural network processing unit.

The accuracy of the additional face detection performed by the neural network processing unit may be higher than the accuracy of the face detection performed by the object detection unit 113. For example, the neural network processing unit may be implemented with a multi-core processor. Alternatively, the neural network processing unit may communicate with a multi-server. After entering the operation mode, the processor 110 may additionally perform face detection to make the accuracy of the face detection high.

Figure 8:
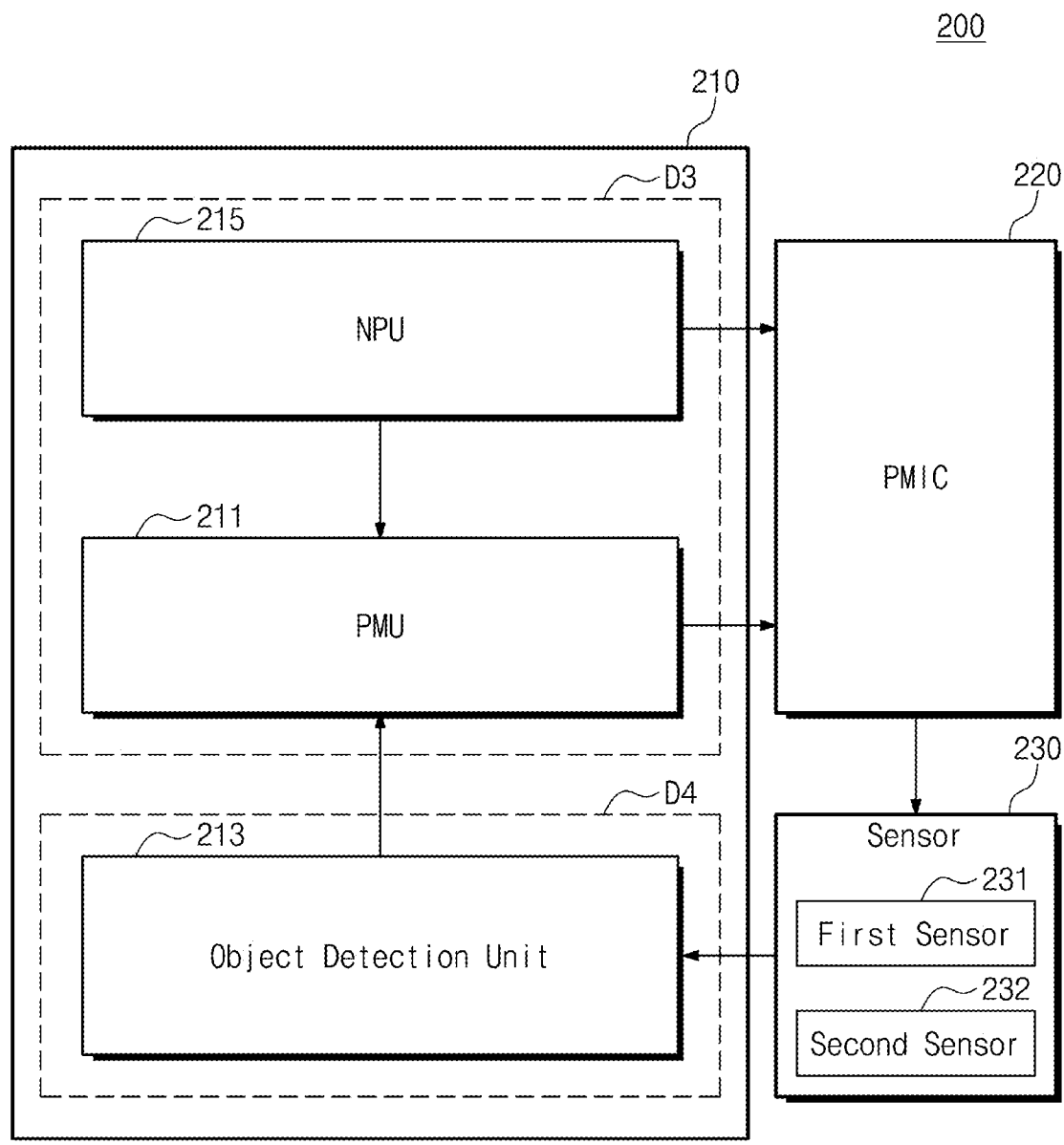
FIG. 8 is a block diagram of an electronic device including a neural network processing unit according to example embodiments of the inventive concepts.

FIG. 8 is a block diagram of an electronic device including a neural network processing unit according to example embodiments of the inventive concepts.

Referring to FIG. 8, an electronic device 200 according to example embodiments of the inventive concepts may include a processor 210, a power supply 220, and a sensor 230. The processor 210 may include a power management unit (PMU) 211, an object detection unit 213, and an NPU 215. The processor 110 may include a first domain D3 selectively supplied with a power from the power supply 220 and a second domain D4 always supplied with a power from the power supply 220. The power management unit 211 and the NPU 215 may be included in the first domain D3. The electronic device 200 of FIG. 8 is similar to the electronic device 100 of FIG. 1, and thus, additional description will be omitted to avoid redundancy.

In the case where the object detection unit 213 detects user's face and transmits a control request signal to the power management unit 211, the power management unit 211 may control the power supply 220 to turn on the first domain D3 and may enter the operation mode. After entering the operation mode, the power management unit 211 may control the power supply 220 to supply a power to the NPU 215. The NPU 215 powered on may additionally perform face detection that the object detection unit 113 performs. The NPU 215 may perform face detection based on a deep learning algorithm and may determine whether data on a face detected by the deep learning algorithm coincide with face data stored in advance.

When it is determined that the data on the detected face do not coincide with the stored face data, the NPU 215 may request the power management unit 211 to return to the standby mode. The power management unit 211 may control the power supply 220 to return to the standby mode. That is, the power management unit 211 may control the power supply 220 such that a power of the first domain D3 is turned off, a power of a first sensor 231 is turned on, and a second sensor 232 is changed to or maintained in the standby state.

Figure 9:
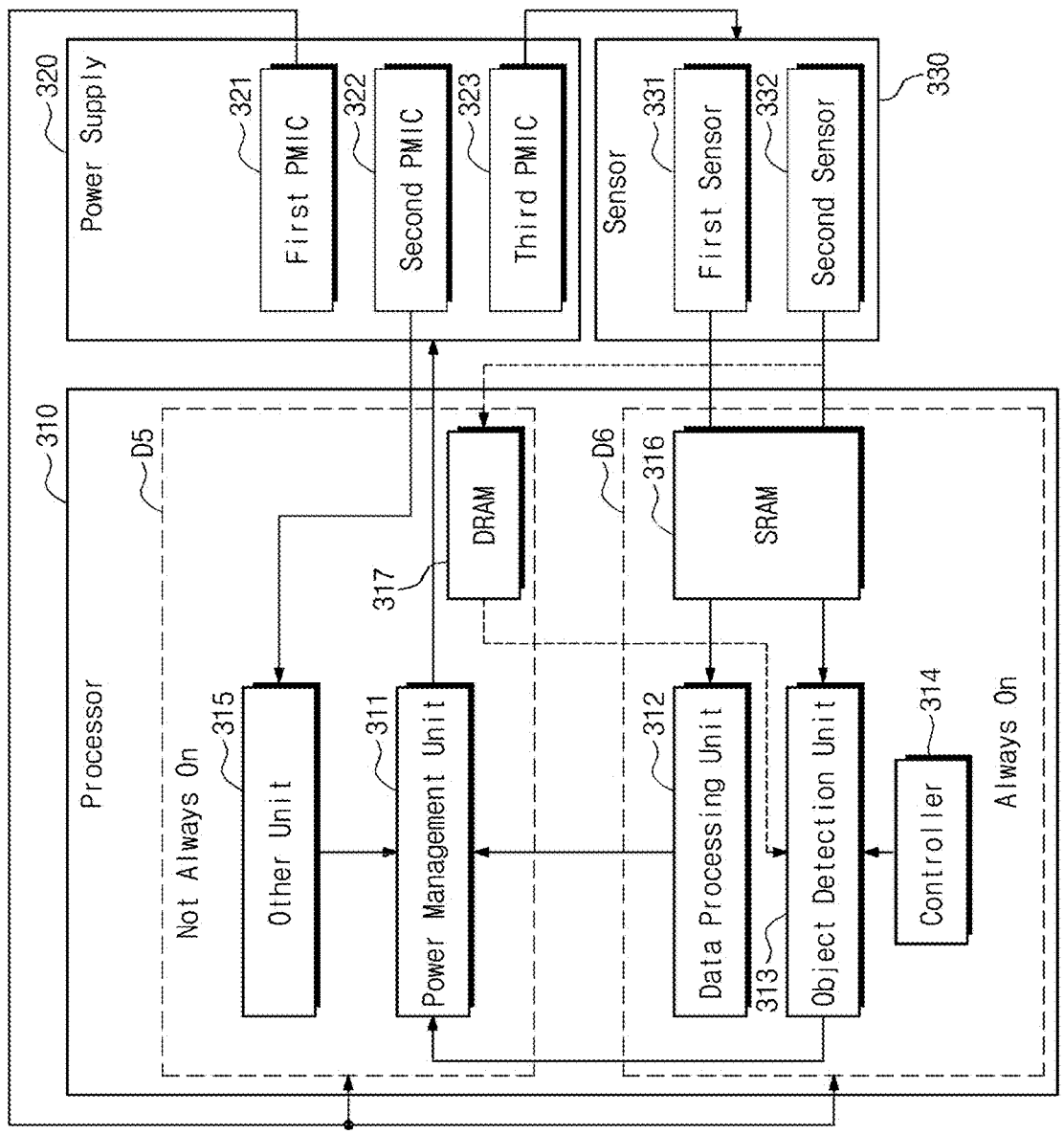
FIG. 9 is a block diagram of an electronic device to which memories are added, according to example embodiments of the inventive concepts.

FIG. 9 is a block diagram of an electronic device to which memories are added, according to example embodiments of the inventive concepts.

Referring to FIG. 9, an electronic device 300 according to example embodiments of the inventive concepts may include a processor 310, a power supply 320, and a sensor 330. The processor 310 may include a memory. The memory may include an SRAM 316 and a DRAM 317. The processor 310 may include a first domain D5 selectively supplied with a power and a second domain D6 always supplied with a power. The DRAM 317 may be included in the first domain D5, and the SRAM 316 may be included in the second domain D6. The electronic device 300 of FIG. 9 is similar to the electronic device 100 of FIG. 1, and thus, additional description will be omitted to avoid redundancy.

The SRAM 316 may store data of the sensor 330 in the standby mode. The SRAM 316 may receive and store the first data DATA_1 from a first sensor 331. A data processing unit 312 may receive the first data DATA_1 from the SRAM 316 for the purpose of determining whether to need to perform face detection. Referring to FIG. 9, the SRAM 316 may be separated from the data processing unit 312. According to example embodiments, the SRAM 316 may be included in the data processing unit 312. That is, the SRAM 316 may include the memory 112*a*-11 of FIG. 4A or the first memory 112*b*-11 and the second memory 112*b*-22 of FIG. 4B. In some example embodiments, the memories 112*a*-11, 112*b*-11, and 112*b*-22 may be implemented with one or more SRAMs. The data processing unit 312 may store the first data DATA_1 in the SRAM 316 and thus may determine whether to need to perform face detection with lower power in the standby mode.

The SRAM 316 may receive and store the second data DATA_2 from a second sensor 332. An object detection unit 313 may receive the second data DATA_2 from the SRAM 316 for the purpose of performing the face detection operation. Referring to FIG. 9, the SRAM 316 may be separated from the object detection unit 313. According to example embodiments, the SRAM 316 may be included in the object detection unit 313. The second domain D6 may store and process data by using the SRAM 316 in the standby mode, thus performing the face detection operation quickly.

The DRAM 317 may store data of the sensor 330 in the operation mode. The DRAM 317 may receive and store the second data DATA_2 from the second sensor 332. By using the DRAM 317 in the operation mode, the object detection unit 313 may store and process more data by using the SRAM 316. In some example embodiments, the object detection unit 313 may use the SRAM 316 as a cache memory.

Figure 10:
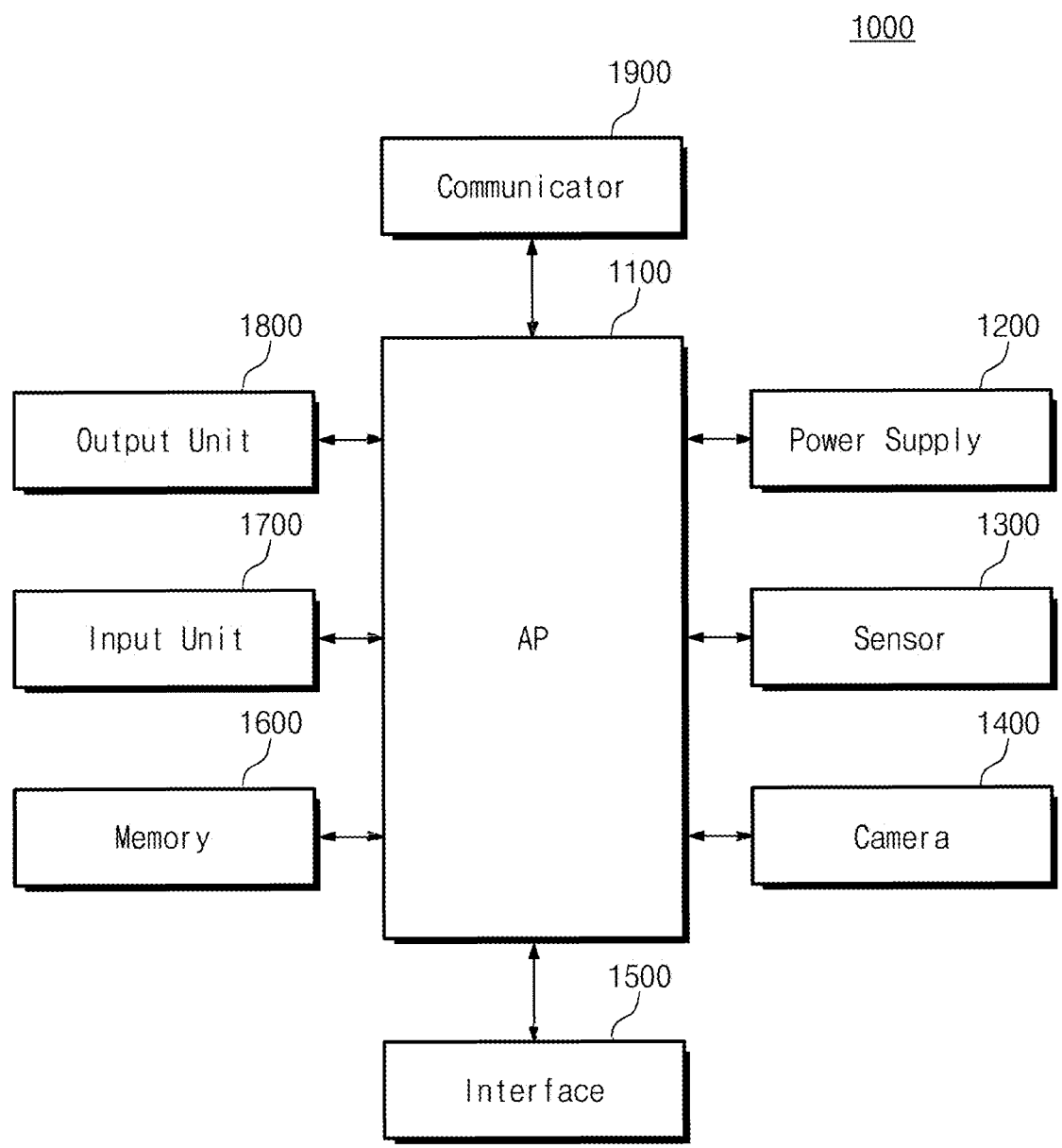
FIGS. 10 and 11 are diagrams illustrating a mobile terminal in which an electronic device according to example embodiments of the inventive concepts is installed.
Figure 11:
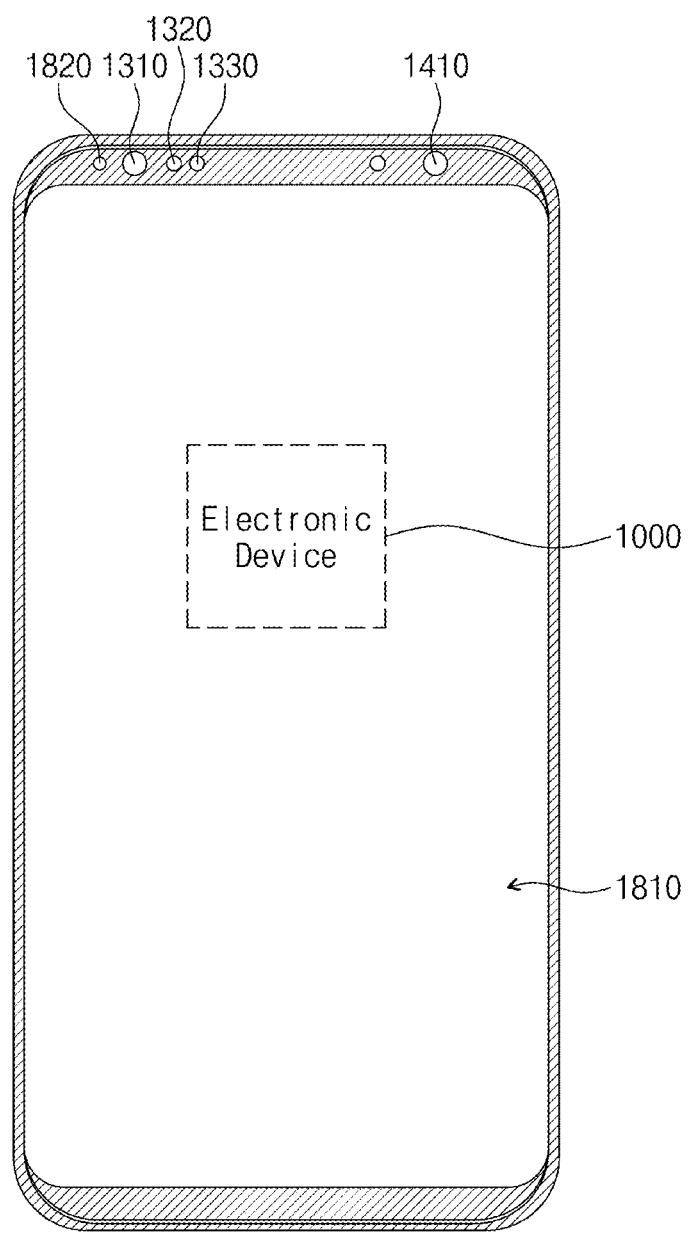

FIGS. 10 and 11 are diagrams illustrating a mobile terminal in which an electronic device according to example embodiments of the inventive concepts is installed.

Referring to FIG. 10, an electronic device 1000 may include an application processor 1100, a power supply 1200, a sensor 1300, a camera 1400, an interface 1500, a memory 1600, an input unit 1700, an output unit 1800, and a communicator 1900.

The application processor 1100 may drive, for example, an operating system (OS) or an application to control a plurality of hardware or software components connected with the application processor 1100 and may process and compute various kinds of data. The description given with reference to the processor 110 of FIG. 1 may be applied to the application processor 1100.

The power supply 1200 may manage the power of the electronic device 1000 by supplying a power of the electronic device 1000 and blocking a power supply to the electronic device 1000. According to example embodiments, the power supply 1200 may include a power management integrated circuit (PMIC), a charger integrated circuit, or a battery or fuel gauge. The description given with reference to the power supply 120 of FIG. 1 may be applied to the PMIC. The battery gauge may measure, for example, a level of a battery, and a battery voltage, current or temperature while the battery is being charged. The battery may include, for example, a rechargeable battery and/or a solar battery.

The description given with reference to the first sensor 131 of FIG. 1 may be applied to the sensor 1300. The sensor 1300 may include, for example, at least one of a distance sensor, a gesture sensor, a gyro sensor, a pressure sensor, a magnetic sensor, an acceleration sensor, a grip sensor, a proximity sensor, a color sensor (e.g., red, green and blue (RGB) sensor), a biometric sensor, a temperature/humidity sensor, an illumination sensor, a thermal sensor, and an ultraviolet (UV) sensor. Additionally or alternatively, the sensor 1300 may include, for example, an E-nose sensor, an electromyography sensor (EMG) sensor, an electroencephalogram (EEG) sensor, an electrocardiogram (ECG) sensor, an infrared (IR) sensor, an iris sensor, and/or a fingerprint sensor.

The sensor 1300 may further include a control circuit for controlling at least one or more sensors included therein. According to example embodiments, the electronic device 1000 may further include a processor that is a part of the application processor 1100 or is independent of the application processor 1100 and is configured to control the sensor 1300. The processor may control the sensor 1300 while the application processor 1100 is in a sleep state.

The camera 1400 that is a device for photographing a still image or a video may include, for example, one or more image sensors (e.g., a front sensor and a rear sensor), a lens, an image signal processor (ISP), or a flash (e.g., a light emitting diode (LED) or a xenon lamp). The description given with reference to the second sensor 132 of FIG. 1 may be applied to the camera 1400.

The interface 1500 may include, for example, a high-definition multimedia interface (HDMI), a universal serial bus (USB) interface, an optical interface, or a D-subminiature (D-sub) interface. Additionally or alternatively, the interface 1500 may include, for example, a mobile high definition link (MHL) interface, a SD card/multi-media card (MMC) interface, or an infrared data association (IrDA) standard interface.

The memory 1600 may include, for example, an internal (or embedded) memory or an external memory. The internal memory may include, for example, at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), a hard drive, and a solid state drive (SSD)).

The external memory may include a flash drive, for example, compact flash (CF), secure digital (SD), micro secure digital (Micro-SD), mini secure digital (Mini-SD), extreme digital (xD), a multimedia card (MMC), a memory stick, or the like. The external memory may be operatively and/or physically connected with the electronic device 1000 through various interfaces.

The input unit 1700 may include, for example, a touch panel, a (digital) pen sensor, a key, or an ultrasonic input device. For example, the touch panel may use at least one of capacitive, resistive, infrared, and ultrasonic detecting manners. Also, the touch panel may further include a control circuit. The touch panel may further include a tactile layer. In some example embodiments, the touch panel may provide a tactile reaction to the user.

The (digital) pen sensor may be, for example, a part of the touch panel or may include a separate sheet for recognition. The button may include, for example, a physical button, an optical key, or a keypad. The ultrasonic input device may detect (or sense) an ultrasonic signal, which is generated from an input device, through a microphone and may check data corresponding to the detected ultrasonic signal.

The output unit 1800 may include a display module and an audio module. The display module may include a panel, a hologram device, or a projector. The panel may be implemented to be, for example, flexible, transparent, or wearable. The panel and the touch panel may be implemented with one module. The hologram device may show a stereoscopic image in a space by using the interference of light. The projector may project a light onto a screen to display an image. The screen may be placed inside or outside the electronic device 1000. According to example embodiments, the display module may further include a control circuit for controlling the panel, the hologram device, or the projector.

The audio module may convert, for example, a sound and an electrical signal in dual directions. The audio module may process, for example, sound information that is inputted or output through a speaker, a receiver, an earphone, a microphone, or the like.

A configuration of the communicator 1900 may be identical or similar to that of a communication interface. The communicator 1900 may include, for example, a cellular module, a wireless-fidelity (Wi-Fi) module, a Bluetooth (BT) module, a global positioning system (GPS) module, a near field communication (NFC) module, and a radio frequency (RF) module. The communicator 1900 may further include a bus. The bus may interconnect the above components included in the electronic device 1000 and may include a circuit that transfers control signals, data, or the like between the components.

Referring to FIG. 11, a mobile terminal 2000 may include the electronic device 1000. The electronic device 1000 may be installed within the mobile terminal 2000. For example, a display panel 1810, an LED module 1820, a plurality of sensors 1310, 1320, and 1330, and a camera 1410 may be placed on a front surface of the mobile terminal 2000.

The display panel 1810 may output an operation state of the electronic device 1000 as an image. The display panel 1810 and a touch panel may be implemented with one module. That is, the display panel 1810 may receive the setting signal, which allows the face detection function to be turned on in the standby mode, as a touch input of the user.

The LED module 1820 may display a driving state of the electronic device 1000 by outputting an LED light to the outside of the electronic device 1000. For example, the LED module 1820 may display a driving state by using an LED light of a red, green, or a blue color in the operation mode. Also, the LED module 1820 may not operate in the standby mode.

The plurality of sensors 1310, 1320, and 1330 may be a proximity sensor, an illumination sensor, and/or a proximity illumination IR sensor. At least one of the plurality of sensors 1310, 1320, and 1330 may acquire first data that are not image data. A data processing unit in the application processor 1100 may receive the first data and may determine whether to need to perform face detection based on the first data.

When the data processing unit determines that there is a need to perform face detection, the camera 1410 may operate. The camera 1410 may acquire second data including image data. An object detection unit in the application processor 1100 may receive the second data and may perform face detection based on the second data.

As described above, the face detection operation according to example embodiments may be understood as a QR code detection operation. For example, an object may include a QR code. In some example embodiments, a sensor may be a sensor detecting a QR code, and the data processing unit may determine whether to need to detect a QR code, by determining whether a QR code is present within a given distance in the standby mode. When it is determined that there is a need to detect a QR code, the data processing unit may request a power management unit to supply a power to the camera 1410. The object detection unit may acquire image information through the camera 1410 and may detect information of a QR code. The object detection unit may determine whether data on the detected QR code coincide with QR code data stored in advance. Depending on the detected QR code, the power management unit may enter the operation mode or may supply a power to any other unit. For example, the power management unit may turn on a power of a payment system based on information the QR code associated with a payment request.

According to example embodiments of the inventive concepts, as a data processing unit included in an "Always On" domain determines whether to need to perform face detection or QR code detection based on first data, the face detection or QR code detection may be always performed in a standby mode without an input of a user.

According to example embodiments of the inventive concepts, as the power management unit controls a power supply through control request signals received from a data processing unit and an object detection unit included in the "Always On" domain, the face detection or QR code detection may be performed with lower power even in the standby mode.

While the inventive concepts have been described with reference to example embodiments thereof, it will be apparent to those of ordinary skill in the art that various changes and modifications may be made thereto without departing from the spirit and scope of the inventive concepts as set forth in the following claims.

What is claimed is:

1. An electronic device comprising:
a power supply;
a first sensor configured to acquire first data including information about an external object;
a second sensor configured to acquire second data including image information about the external object; and
processing circuitry,
wherein the processing circuitry includes:
always-on domain processing circuitry configured to determine whether to need to perform face detection or QR code detection based on the first data and to output a first control request signal of requesting a power supply to the second sensor based on a result of the determination; and not-always-on domain processing circuitry configured to control the power supply in response to the first control request signal such that a power is supplied to the second sensor;

wherein the always-on domain processing circuitry is further configured to perform the face detection or the QR code detection based on the second data, and wherein the not-always-on domain processing circuitry is configured to control the power supply such that an operating voltage and an operating frequency of an always-on domain are smaller in a standby mode than in an operation mode.

2. The electronic device of claim 1, wherein the first data include at least one of distance information, illuminance information, thermal information, temperature information, speed information, acceleration information, biometric information, color information, and pressure information about the external object.

3. The electronic device of claim 2, wherein the processing circuitry is configured perform the face detection or the QR code detection through an always-on domain without an input of a user in a standby mode.

4. The electronic device of claim 1, wherein the always on domain processing circuitry is configured to:

perform first determination on whether to need to perform the face detection or the QR code detection; and perform second determination on whether to need to perform the face detection or the QR code detection, wherein, when a result of the first determination has a reliability of a reference value or less, the second determination is performed, and wherein an accuracy and power consumption of the first determination are lower than an accuracy and power consumption of the second determination.

5. The electronic device of claim 1, wherein the always-on domain processing circuitry is configured to perform the face detection or the QR code detection based on a neural network model and determines whether data on a detected face or a detected QR code coincide with data stored in advance.

6. The electronic device of claim 5, wherein, when it is determined that the data on the detected face or the detected QR code coincide with the data stored in advance, the always-on domain processing circuitry is configured to output a second control request signal of requesting entering an operation mode, and wherein the not-always-on domain processing circuitry is configured to control the power supply in response to the second control request signal such that a power is supplied to a not-always-on domain.

7. The electronic device of claim 6, wherein the not-always-on domain processing circuitry is configured to perform additional face detection or additional QR code detection based on a deep learning algorithm, and wherein an accuracy of the additional face detection or the additional QR code detection is higher than an accuracy of the face detection or the QR code detection.

8. The electronic device of claim 5, wherein, when it is determined that the data on the detected face or the detected QR code do not coincide with the data stored in advance, the always-on domain processing circuitry is configured to output a third control request signal of requesting a change of the second sensor to a standby state, and wherein the not-always-on domain processing circuitry is configured to control the power supply in response to the third control request signal such that an amount of power to be supplied to the second sensor decreases.

9. The electronic device of claim 5, wherein the always-on domain processing circuitry further includes controller circuitry configured to control the always-on domain processing circuitry.

10. The electronic device of claim 1, wherein the processing circuitry further includes a static random access memory (SRAM) configured to receive and store the first data from the first sensor or to receive and store the second data from the second sensor.

11. The electronic device of claim 1, wherein the power supply includes:

first power management circuitry configured to continue to supply a power to the always-on domain processing circuitry; and second power management circuitry configured to supply a power to one of the first sensor or the second sensor.

12. An operating method of an electronic device which includes an "Always On" domain continuously supplied with a power and present in processing circuitry, the method comprising:

acquiring first data including information about an external object through a first sensor;

determining whether to need to perform face detection or QR code detection based on the first data;

outputting a first control request signal of requesting a power supply to a second sensor based on a result of the determining of whether to need the face detection or the QR code detection;

supplying a power to the second sensor in response to the first control request signal;

controlling, by a not-always-on domain processing circuitry, the power supply in response to the first control request signal such that a power is supplied to the second sensor such that an operating voltage and an operating frequency of an always-on domain are smaller in a standby mode than in an operation mode;

acquiring second data including image information about the external object through the second sensor;

performing the face detection or the QR code detection based on the second data; and controlling a power supply based on a result of the face detection or the QR code detection, wherein the determining of whether to need the face detection or the QR code detection, the outputting of the first control request signal, and the performing of the face detection or the QR code detection are performed in an always-on domain of the processing circuitry.

13. The method of claim 12, wherein the determining of whether to need the face detection or the QR code detection includes:

receiving the first data from the first sensor;

performing first determination on whether to need to perform the face detection or the QR code detection based on the first data; and when a result of the first determination has reliability of a reference value or less, performing second determination on whether to need to perform the face detection or the QR code detection, and wherein an accuracy and power consumption of the first determination are lower than an accuracy and power consumption of the second determination.

14. The method of claim 12, wherein the performing of the face detection or the QR code detection includes:

receiving the second data from the second sensor; and determining whether data on a detected face or a detected QR code through a neural network model coincide with data stored in advance, based on the second data.

15. The method of claim 14, wherein the controlling of the power supply includes:
outputting a second control request signal of requesting entering an operation mode, based on a determination result indicating that the data on the detected face or the detected QR code coincide with the data stored in advance; and
supplying a power to a not-always-on domain of the processing circuitry or in response to the second control request signal.

16. The method of claim 15, wherein the controlling of the power supply further includes:
supplying a power to neural processing circuitry performing additional face detection or additional QR code detection based on a deep learning algorithm, when the power is supplied to the not-always-on domain,
wherein an accuracy of the additional face detection or the additional QR code detection is higher than an accuracy of the face detection or the QR code detection.

17. The method of claim 14, wherein the controlling of the power supply includes:
outputting a third control request signal of requesting a change of the second sensor to a standby state, based on a determination result indicating that the data on the detected face or the detected QR code do not coincide with the data stored in advance; and
decreasing an amount of power to be supplied to the second sensor in response to the third control request signal.

18. An application processor comprising:
always-on domain processing circuitry configured to:
receive first data including information about an external object from a first sensor and to determine whether to need to perform face detection or QR code detection based on the first data and receive second data including image information about the external object from a second sensor and to perform the face detection or the QR code detection based on the second data; and
not-always-on domain processing circuitry configured to control a power supply in response to a control request signal output from the always-on domain processing circuitry,
wherein the always-on domain processing circuitry is always supplied with a power from the power supply, and
wherein the not-always-on domain processing circuitry is configured to control the power supply such that an operating voltage and an operating frequency of an always-on domain are smaller in a standby mode than in an operation mode.

19. The application processor of claim 18, wherein the first data include at least one of distance information, illuminance information, thermal information, temperature information, speed information, acceleration information, biometric information, color information, and pressure information about the external object.

* * * * *